United States Patent Office 3,378,519
Patented Apr. 16, 1968

3,378,519
ULTRAVIOLET LIGHT STABILIZED POLYPROPYL-
ENE WITH HYDROXYANTHRAQUINONES
Gordon C. Newland and John W. Tamblyn, Kingsport,
Tenn., assignors to Eastman Kodak Company, Rochester, N.Y., a corporation of New Jersey
No Drawing. Continuation-in-part of application Ser. No.
413,358, Nov. 23, 1964, which is a continuation-in-part
of application Ser. No. 162,963, Dec. 28, 1961. This application Mar. 16, 1966, Ser. No. 534,685
10 Claims. (Cl. 260—45.95)

ABSTRACT OF THE DISCLOSURE

A normally solid thermoplastic composition comprising a poly-α-olefin and, at a concentration sufficient to substantially inhibit ultraviolet light degradation of said poly-α-olefin, at least one substituted anthraquinone.

DISCLOSURE

This patent application is a continuation-in-part of the U.S. patent application Ser. No. 413,358, filed Nov. 23, 1964, for Ultraviolet Light Stabilized 1-olefin Resin Composition (now abandoned), which in turn was a continuation-in-part of Ser. No. 162,963, Dec. 28, 1961, now U.S. Patent 3,166,529, issued on Jan. 19, 1965, for Light Stabilized Poly-α-Olefin Plastic Composition.

This invention resides in the chemical arts. It pertains to 1-olefin resins and to the problem of stabilizing these resins relative to the degradative effects of ultraviolet light.

Normally solid polymers of 1-olefins, such as the well known normally solid polyethylene and crystalline polypropylene, are thermoplastic, synthetic resins which have gained widespread use as materials of construction. However, as is also well known, normally solid 1-olefin resins undergo a photochemical degradation when exposed to ultraviolet light. This effect is frequently termed weathering. It appears to be a photooxidation process which causes rupture of the polymer chains and formation of carbonyl (=C=O) groups. As this degradation progresses, articles manufactured from 1-olefin resins tend to crack, become brittle and lose tensile strength to the extent of mechanical failure.

This invention is based upon the discovery that certain anthraquinones confer on 1-olefin resins a high degree of stability to embrittlement by action of ultraviolet light.

In summary, this invention comprises a normally solid, thermoplastic composition consisting essentially of normally solid 1-olefin resin material and, at an ultraviolet light stabilizing concentration, at least one substituted anthraquinone represented by formula:

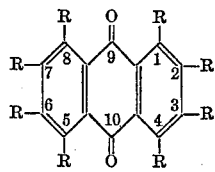

(Formula I)

wherein R in each case is a radical independently selected from the group consisting of the hydrogen, hydroxy, nitro, $C_1$–$C_{20}$ alkyl, halide, trifluoro, phenoxy, phenyl, $C_1$–$C_{20}$ alkoxy, mono($C_1$–$C_{20}$ alkyl)amino and di($C_1$–$C_{20}$ alkyl) amino radicals, and at least one R is a radical selected from said group other than hydrogen.

Of the various substituted anthraquinones that are useful in the practice of the present invention those that are particularly preferred have the structure of Formula I, above, and have at least one hydroxy substituent on the anthraquinone nucleus. Thus, particularly preferred ultraviolet stabilizers for poly-1-olefins are the hydroxyanthraquinones encompassed by the foregoing Formula I. Still further preferred are the hydroxyanthraquinones (encompassed by Formula I, above) that contain either one or two hydroxysubstituents on the anthraquinone nucleus.

The normally solid, 1-olefin resin material of this invention consists essentially of at least one, normally solid, 1-olefin polymer. Such a polymer, commonly referred to generically as a poly-α-olefin, is one which is derived from a 1-monoolefinic hydrocarbon having 2–20 carbon atoms, generally 2–10 carbon atoms, preferably 2–6 carbon atoms and usually 2–4 carbon atoms. It is also provided by the normally solid copolymers, which include graft polymers, addition polymers, block polymers and the like of 1-monoolefinic hydrocarbons having 2–20 carbon atoms, generally 2–10 carbon atoms, preferably 2–6 carbon atoms and commonly 2–4 carbon atoms, as well as of these 1-monoolefinic hydrocarbons and other compounds. Examples of a normally solid polymer derived from a 1-monoolefinic hydrocarbon having 2–20 carbon atoms include the linear and branched, low density and high density, crystalline and amorphous, normally solid homopolymers and copolymers of ethylene, propylene, 1-butene, isobutylene, 1-pentene, 2-methyl-1-pentene, 3-methyl-1-butene, 1-hexene, 3,3-dimethyl-1-butene, 1-heptene, 1-octene, 1-nonene, 1-decene, 4-methyl-1-pentene, 4-methyl-1-hexene, 5-ethyl-1-hexene, 6-methyl-1-heptene, 6-ethyl-1-heptene, styrene, allyl benzene and the like. Processes for preparing a normally solid 1-olefin polymer are well known and described in detail in the prior art. See, for example, the U.S. Patent No. 2,153,553, to Fawcett et al., the U.S. Patent No. 2,912,429, to Cash, and the U.S. Patent No. 2,917,500, to Hagemeyer et al. In general, a normally solid, 1-olefin resin is a thermoplastic material which at 20° C. is solid. It includes the so-called poly-α-olefin waxes which usually have average molecular weights in a range from about 3000 to about 12,000.

The normally solid, 1-olefin resin portion of the 1-olefin composition of this invention, in addition to at least one normally solid, 1-olefin resin, can also comprise other polymeric components. Thus, it can comprise a normally solid resin derived from another 1-monoolefinic hydrocarbon having 2–20 carbon atoms. It can comprise a different kind of polymer, generally present as a physical property improver.

The anthraquinones of this invention, when incorporated into 1-olefin resin material, function to inhibit ultraviolet light degradation of the material. Examples of these anthraquinones are:

1,5-dihydroxyanthraquinone, also known as anthrarufin
1,4-dihydroxyanthraquinone, also known as quinizarin
1,2-dihydroxyanthraquinone, also known as alizarin
1,8-dihydroxyanthraquinone, also known as chrysazin
4,8-dinitroanthrarufin
1,6-dihydroxy-4,5-dinitroanthraquinone
1-hydroxy-5-nitroanthraquinone
1,7-dihydroxy-4,8-dinitroanthraquinone
1-hydroxy-8-nitroanthraquinone
3,7-dimethylanthrarufin
1,8-dihydroxy-2,4,5,7-tetrabromoanthraquinone
3,7-di(trifluoromethyl)anthrarufin
1,6-diphenoxyanthraquinone
6,8-diphenyl-1,4-dihydroxyanthraquinone
3,7-dioctyloxyanthraquinone
2-t-butylamino-1,4-dihydroxyanthraquinone
4,8-dioctylanthrarufin The anthraquinones of this invention generally are readily available or can be readily synthesized. Several processes for synthesizing them are disclosed in the literature. "Topic in Organic Chemistry," Fieser and Fieser, Reinhold Pub. Corp. at page 20, gives a general method for the proparation of substituted anthraquinones by the condensation of the corresponding phthalic anhydride and the corresponding phenol. A general process of synthesis is given by M. S. Newman, J. Amer. Chem. Soc. 1942, 64, 23, 24. A synthesis of 6,8 - diphenyl-1,4 - dihydroxyanthraquinone is described in Bull. Soc. Chim. France (1963) (6), 1141–5. Syntheses of alizarin compounds are described in W. H. Perkins, J. Chem. Soc. 1891, 59, 1012 and S. D. Ross and M. Schwarz, J. Amer. Chem. Soc., 1955, 77, 3020.

Concentration of the ultraviolet light inhibitor of this invention in the normally solid plastic composition is at least sufficient to substantially inhibit ultraviolet light degradation of the 1-olefin resin material. Any concentration greater than this depends generally upon the extent of ultraviolet light stabilization desired. This in turn depends upon a number of factors including subsequent environmental conditions to which the plastic composition of this invention is intended to be exposed. In general, however, a concentration of the ultraviolet light stabilizer of this invention in a range from about 0.1 to about 10% by weight of the total 1-olefin resin content of the composition, that is, the 1-olefin resin material, gives satisfactory results in most end uses of the composition.

The normally solid, 1-olefin resin composition of this invention can also comprise other additives such as, for example, antioxidants, thermal stabilizers, anticorrosion additives, antistatic agents, foaming agents, plasticizers, colorants such as dyes and pigments, waxes, mold relief agents, slip agents, antiblocking agents, fillers, extenders, and the like, including physical property improvers other than polymeric compounds.

The normally solid, 1-olefin resin composition of this invention is made by incorporating the ultraviolet light stabilizer of this invention into the normally solid, 1-olefin resin material. Generally, such incorporation is performed by any one of a number of known methods, such as, for example, roll compounding, extrusion, solvent mixing and the like. For instance, such incorporation can be performed by heating or otherwise softening the normally solid resin material to a workable consistency and then working in, as by roll compounding, the ultraviolet light stabilizer of this invention until a substantially uniform blend or dispersion is obtained. Generally, such incorporation takes place at the same time that other additives are normally incorporated into the 1-olefin resin material and usually along with such other additives as the formulation of the particular embodiment of the plastic composition requires.

The normally solid plastic composition of this invention is useful in coatings and as a material of construction for shaped articles. Thus, the composition can be made into various shaped articles such as, for example, pellets, sheeting, films, bars, tubes, filaments, fibers, specially shaped structural elements and the like as by conventional casting and molding techniques which include extrusion, blow molding and the like.

This invention is further illustrated by the following examples of various aspects thereof, including preferred specific embodiments of this invention. This invention is not limited to these specific embodiments unless otherwise indicated.

Example 1

This example illustrates the synthesis of 1,6-diphenoxyanthraquinone.

37 grams of 1,6-dichloroanthraquinone are admixed with 300 grams of phenol, 23 grams of potassium hydroxide and 2 grams of copper dust. The resulting mixture is boiled gently for 3½ hours under an air condenser. The mixture is then cooled to 80° C., added to 130 grams of sodium hydroxide in 1300 milliliters of water and heated for 30 minutes at 85–90° C. The mixture is cooled, filtered, washed with water, air dried, boiled in 200 milliliters of ethanol, refiltered and then dried. The product thus obtained consists essentially of 1,6-diphenoxyanthraquinone. This can be verified by a carbon and hydrogen analysis. Calc.: C=79.62%, H=4.08%; typical finding: C=71.68%, H=3.36%.

Example 2

This example illustrates the synthesis of 1,6-dihydroxy-4,5-dinitroanthraquinone.

320 grams of 100% sulfuric acid are added to a mixture of 39 grams of 90% fuming nitric acid and 101 grams of 100% sulfuric acid. 36 grams of 1,6-diphenoxyanthraquinone are added portionwise to the mixture of acids at a temperature below 30° C. The reaction mixture thus obtained is stirred for 16 hours at room temperature and then 2 hours at 40° C. The reaction mixture is then poured into 1½ liters of water, filtered and pressed dry. The filter cake is then added to 100 grams of 30% sodium hydroxide in 1250 milliliters of water at 90° C., cooled to 40° C., stirred for 16 hours, filtered, washed with water and again stirred in 300 milliliters of water made acid to Congo red paper with concentrated hydrochloric acid. The slurry is stirred for 1 hour, filtered and then washed until neutral. The solids thus obtained are dried and then recrystallized from chlorobenzene to give a product that consists essentially of 1,6-dihydroxy-4,5-dinitroanthraquinone. This can be confirmed by a carbon, hydrogen and nitrogen analysis. Calc.: C=50.9%; H=1.82%, N=8.48%; typical finding: C=48.74%; H=1.68%, N=7.58%.

Example 3

This example illustrates the synthesis of 2-t-butyl-1,4-dihydroxyanthraquinone.

3.19 grams of 2-bromo-1,4-dihydroxyanthraquinone, 15 milliliters of t-butylamine and 200 milliliters of ethylene glycol monomethyl ether are admixed. The resulting mixture is heated slowly to reflux and then refluxed for 20 hours. The reaction mixture thus obtained is cooled to room temperature, filtered, washed with water and dried to give a product consisting essentially of 2-t-butyl-1,4-dihydroxyanthraquinone. A typical yield of the product is 2.88 grams.

Example 4–8

These examples illustrate specific embodiments of a polyethylene composition of this invention.

The formulations of these embodiments are set forth in decreasing order of preference in the following table.

| Components | Concentration in Parts by Wt. | | | | |
|---|---|---|---|---|---|
| | Ex. 4 | Ex. 5 | Ex. 6 | Ex. 7 | Ex. 80 |
| Normally solid polyethylene | 100 | 100 | 100 | 100 | 10 |
| 1,5-dihydroxy-4-dodecyloxy-8-nitroanthraquinone | 1 | | | | |
| 1-hydroxy-8-nitroanthraquinone | | 1 | | | |
| 1,5-dihydroxy-4,8-dinitroanthraquinone | | | 1 | | |
| 1,5-dihydroxyanthraquinone | | | | 1 | |
| 1,8-dihydroxyanthraquinone | | | | | 1 |

The specific embodiments according to these formulations are made by hot roll-compounding the normally solid polyethylene with the other component called for in each formulation. The specific embodiments thus made are obtained in the form of roll slabs.

These specific embodiments are useful in films, coatings and in the fabrication of shaped articles.

Examples 9–24

These examples illustrate specific embodiments of a polypropylene composition of this invention.

The formulations of these specific embodiments are presented in decreasing order of preference in the following table.

The formulations of these embodiments are set forth in decreasing order of preference in the following table.

| Components | Concentrations in Parts by Wt. | | | |
|---|---|---|---|---|
| | Ex. 25 | Ex. 26 | Ex. 27 | Ex. 28 |
| Normally solid poly(1-octadecene) | 100 | 100 | 100 | 100 |
| 1-hydroxy-8-nitroanthraquinone | 5 | | | |
| 1,5-dihydroxy-4,8-dinitroanthraquinone | | 5 | | |
| 1,5-dihydroxyanthraquinone | | | 5 | |
| 1,8-dihydroxyanthraquinone | | | | 5 |

The specific embodiments according to these formulations are made by dry blending the components called for in each formulation.

The specific compositions thus obtained are useful in films, coatings and in the fabrication of shaped articles.

Examples 29–31

These examples illustrate specific embodiments of a poly(3-methyl-1-butene) composition of this invention.

The formulations of these specific embodiments are presented in decreasing order of preference in the following table.

| Components | Concentrations in Parts by Weight | | | | | | | | | | | | | | | |
|---|---|---|---|---|---|---|---|---|---|---|---|---|---|---|---|---|
| | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
| Crystalline polypropylene | 100 | 100 | 100 | 100 | 100 | 100 | 100 | 100 | 100 | 100 | 100 | 100 | 100 | 100 | 100 | 100 |
| Dilauryl 3,3'-thiodipropionate | 0.8 | | | | 0.8 | | | | | | | | | | | |
| 4,4'-butylidenebis(6-t-butyl-m-cresol) | 0.4 | | | | 0.4 | | | | | | | | | | | |
| 1-hydroxy-8-nitroanthraquinone | 1 | 5 | | | | | | | | | | | | | | |
| 1,7-dihydroxy-4,8-dinitroanthraquinone | | | 5 | | | | | | | | | | | | | |
| 1-hydroxy-5-nitroanthraquinone | | | | 5 | | | | | | | | | | | | |
| 1,5-dihydroxy-4,8-dinitroanthraquinone | | | | | 1 | 5 | | | | | | | | | | |
| 2-t-butylamino-1,4-dihydroxy-anthraquinone | | | | | | | 5 | | | | | | | | | |
| 1,6-dihydroxy-4,5-dinitroanthraquinone | | | | | | | | 5 | | | | | | | | |
| 1,6-diphenoxyanthraquinone | | | | | | | | | 5 | | | | | | | |
| 1,5-dinitro-2,6-dihydroxyanthraquinone | | | | | | | | | | 5 | | | | | | |
| 1,8-dihydroxyanthraquinone | | | | | | | | | | | 5 | | | | | |
| 1,4-dihydroxyanthraquinone | | | | | | | | | | | | 5 | | | | |
| 1,5-dihydroxyanthraquinone | | | | | | | | | | | | | 5 | | | |
| 1-hydroxyanthraquinone | | | | | | | | | | | | | | 5 | | |
| 1,8-dihydroxy-2,4,5,7-tetrabromoanthraquinone | | | | | | | | | | | | | | | 5 | |
| 1,4-dihydroxy-2-(2-hydroxyethyl)-anthraquinone | | | | | | | | | | | | | | | | 5 |

The specific embodiments according to these formulations are made by admixing the polypropylene with the other component or components called for in each formulation. Such admixing can be performed in warm (145° C.) tetralin with the polypropylene being completely dissolved therein at a weight ratio of 1 part of polypropylene to 25 parts of tetralin. In such case the resulting dope is generally cast and the tetralin evaporated to leave a film of the polypropylene composition.

The specific embodiments according to these formulations are also made by dry blending polypropylene pellets in which other additives such as 4,4-butylidenebis(6-t-butyl-m-cresol) and dilauryl 3,3'-thiodipropionate are added prior to formation of the pellets.

The specific compositions thus obtained are useful in films, coatings, fibers and in the fabrication of shaped articles.

Examples 25–28

These examples illustrate specific embodiments of a poly(1-octadecene) composition of this invention.

| Components | Concentrations in Parts by Wt. | | |
|---|---|---|---|
| | Ex. 29 | Ex. 30 | Ex. 31 |
| Normally solid poly(3-methyl-1-butene) | 100 | 100 | 100 |
| 1,5-dihydroxy-4,8-dinitroanthraquinone | 5 | | |
| 1,5-dihydroxyanthraquinone | | 5 | |
| 1,8-dihydroxyanthraquinone | | | 5 |

The specific embodiments according to these formulations are made by dry blending the components called for in each formulation.

The specific compositions thus obtained are useful in films, coatings, and in the fabrication of shaped articles.

Examples 32–35

These examples illustrate specific embodiments of a poly(4-methyl-1-pentene) composition of this invention.

The formulations of these specific embodiments are presented in decreasing order of preference in the following table.

| Components | Concentrations in Parts by Wt. | | | |
|---|---|---|---|---|
| | Ex. 32 | Ex. 33 | Ex. 34 | Ex. 35 |
| Normally solid poly(4-methyl-1-pentene) | 100 | 100 | 100 | 100 |
| 1-hydroxy-8-nitroanthraquinone | 5 | | | |
| 1,5-dihydroxy-4,8-dinitroanthraquinone | | 5 | | |
| 1,5-dihydroxyanthraquinone | | | 5 | |
| 1,8-dihydroxyanthraquinone | | | | 5 |

The specific embodiments according to these formulations are made by dry blending the components called for in each formulation.

The specific compositions thus obtained are useful in films, coatings and in the fabrication of shaped articles.

Examples 36–38

These examples illustrate specific embodiments of a propylene–butene-1 copolymer composition of this invention.

The formulations of these specific embodiments are presented in decreasing order of preference in the following table.

| Components | Concentrations in Parts by Wt. | | |
|---|---|---|---|
| | Ex. 36 | Ex. 37 | Ex. 38 |
| Normally solid copolymer of propylene and 1-butene at weight ratio of propylene to 1-butene of 80:20 | 100 | 100 | 100 |
| 1,5-dihydroxy-4,8-dinitroanthraquinone | 5 | | |
| 1,8-dihydroxyanthraquinone | | 5 | |
| 1,5-dihydroxyanthraquinone | | | 5 |

The specific embodiments according to these formulations are made by dry blending the components call for in each formulation.

The specific composition thus obtained are useful in films, coatings and in the fabrication of shaped articles.

The ultraviolet light stability of the 1-olefin resin composition of this invention is demonstrated by the following data obtained at various times in the ultraviolet light stability testing of samples of various 1-olefin resin compositions.

The first series of tests involved samples of polyethylene compositions. The samples were made from a normally solid polyethylene having a density of 0.92. Each sample was made by hot roll compounding the polyethylene and 1 part per 100 parts of polyethylene of the additive indicated for that sample in the following table, the temperature of the rear roll being at 220° F. and the temperature of the front roll being at 270° F. The total milling time for each sample was 4 minutes. Flat plates, 0.048 inch thick, were compression molded from the samples. The stability testing comprised exposing these flat plates outdoors at Kingsport, Tenn., for 60 days. At the end of that time the relative carbonyl content of the exposed plates was determined by infrared absorption at 5.82μ.

The formulations of the samples and the test results are summarized in the following table.

| Sample No. | Additive | Relative Carbonyl Content |
|---|---|---|
| 1 | None | 20 |
| 2 | 1,5-dihydroxy-4-dodecyloxy-8-anthraquinone | 2 |
| 3 | 1-hydroxy-8-nitroanthraquinone | 4 |
| 4 | 1,5-dihydroxy-4,8-dinitroanthraquinone | 6 |
| 5 | 1,5-dihydroxyanthraquinone | 8 |
| 6 | 1,8-dihydroxyanthraquinone | 10 |

Samples 2–6, it will be observed, correspond to the formulations of Examples 4–8.

These data show that the specific anthraquinones of this invention involved in this series of tests were effective ultraviolet light stabilizers for polyethylene.

The next series of tests comprised samples of polypropylene compositions. Each sample in this series was made by preparing a 4% dope of a crystalline polypropylene and tetralin and in each case adding 5 parts by weight of the additive indicated for that sample in the following table to 100 parts by weight of the crystalline polypropylene contained in the dope. After heating the resulting sample at 145° C. for 40 minutes, it was cast onto a ferro-type plate which was established and maintained at a temperature of 143° C. After evaporation of the tetralin from the cast dope, which require about 10 minutes at 143° C., the plate and resulting film were quenched in water and the film peeled from the plate. Test specimens (2.5 inches x 0.5 inch) were cut from these films and exposed in an Atlas Twin-Arc Weather-Ometer, type DLTS, modified with ten 20 watt Westinghouse fluorescent sunlamps [Anal. Chem., 25, 460 (1953)], which apparatus is hereinafter referred to as the modified Weather-Ometer. Test results in the modified Weather-Ometer have been found to correlate with test results obtained outdoors at Kingsport, Tenn. The exposure time required to render the film specimens brittle when creased with the exposed side of the film on the outside of the crease was thereby determined. From the exposure times for each specimen, one of which was a film of crystalline polypropylene containing no ultraviolet light inhibitor, a stabilization rating was calculated for each sample. The stabilization rating is the ratio of exposure time required to embrittle the film with an ultraviolet light inhibitor to the exposure time required to emprittle the film without an altraviolet light inhibitor. The formulations of the samples and results of the stability testing are summarized in the following table.

| Sample No. | Additive | Stabilization Rating |
|---|---|---|
| 1 | None | 1 |
| 2 | 1-hydroxy-8-nitroanthraquinone | 44 |
| 3 | 1,7-dihydroxy-4,8-dinitroanthraquinone | 28 |
| 4 | 1-hydroxy-5-nitroanthraquinone | 26 |
| 5 | 1,5-dihydroxy-4,8-dinitroanthraquinone | 21 |
| 6 | 2-t-butylamino-1,4-dihydroxyanthraquinone | 20 |
| 7 | 1,6-dihydroxy-4,5-dinitroanthraquinone | 16 |
| 8 | 1,6-diphenoxyanthraquinone | 8 |
| 9 | 1,5-dinitro-2,6-dihydroxyanthraquinone | 4 |
| 10 | 1,8-dihydroxyanthraquinone | 4 |
| 11 | 1,4-dihydroxyanthraquinone | 4 |
| 12 | 1,5-dihydroxyanthraquinone | 4 |
| 13 | 1-hydroxyanthraquinone | 3 |
| 14 | 1,8-dihydroxy-2,4,5,7-tetrabromoanthraquinone | 2 |
| 15 | 1,4-dihydroxy-2-(2-hydroxyethyl)-anthraquinone | 2 |

Samples 2–15 correspond to the specific embodiments of Examples 10–12 and 14–24, respectively.

The stability data of the table show that the anthraquinone compound of this invention are effective ultraviolet light stabilizers for polypropylene.

In the next test series samples of polypropylene compositions were prepared by dry blending crystalline polypropylene pellets with the additives indicated in the following table as additional additives. The polypropylene pellets contained 4,4'-butylidenebis(6-t-butyl-m-cresol) at a concentration of 0.4% by weight based on the polypropylene and dilauryl 3,3'-thiodipropionate at a concentration of 0.8% based on the weight of the polypropylene. The concentration of each of the additional additives was 1 part per 100 parts of crystalline polypropylene. The blended pellets of each sample were extruded as 400 denier monofilament. The monofilament specimens of each sample were then exposed in an Atlas Sunshine Arc Weather-Ometer, type XWR, and the progress of weathering was followed by periodically measuring the tenacity and elongation of the monofilament specimens. The number of hours of exposure of each specimen required to reach a 50% reduction in tenacity and elongation is thereby determined. The formulations of the samples and the results of the weathering tests are presented in the following table.

| Sample No. | Additional Additive | Hours of Exposure Required for 50% Reduction | |
|---|---|---|---|
| | | Tenacity | Elongation |
| 1 | None | 150 | 140 |
| 2 | 1,5-dihydroxy-4,8-dinitroanthraquinone | 620 | 460 |
| 3 | 1-hydroxy-8-nitroanthraquinone | 320 | 320 |

Samples 2 and 3 correspond in formulation to the specific embodiments of Examples 9 and 13, respectively.

These data show that the anthraquinones of this invention are effective ultraviolet light inhibitors in polypropylene fiber.

The next test series involved samples of normally solid poly(1-octadecene). The samples were made by dry blending poly(1-octadecene) with the additives indicated in the following table. The additives were incorporated into the poly(1-octadecene) at concentrations of 5% based on the weight of the resin. The samples thus obtained were extruded at 70° C. onto a chilled roll as 10 mil thick films. The films were placed into the modified Weather-Ometer and the hours of exposure until embrittlement was detected were determined. The test results as well as formulations of the samples are presented in the following table.

| Sample No. | Additive | Hours of Exposure Required for Embrittlement |
|---|---|---|
| 1 | None | 160 |
| 2 | 1-hydroxy-8-nitroanthraquinone | 1,340 |
| 3 | 1,5-dihydroxy-4,8-dinitroanthraquinone | 1,230 |
| 4 | 1,5-dihydroxyanthraquinone | 830 |
| 5 | 1,8-dihydroxyanthraquinone | 710 |

Samples 2–5 correspond in formulation to the specific embodiments of Examples 25–28.

These data show that the anthraquinones of this invention are effective ultraviolet light stabilizers for poly(1-octadecene).

The next series of tests comprised samples of other 1-olefin resins. The additives to be tested were added at a 5% concentration level to a 4% by weight dope of the 1-olefin resin in tetralin and mixed 1 hour at a temperature of 145° C. The dope containing the additive in each case was cast on a ferro-type plate at a temperature of 143° C. and the tetralin was evaporated. When the tetralin was completely evaporated the film remaining on the plate, which film was about 0.003 inch thick, was quenched in cold water and peeled from the plate. Test specimens of the film in each case (2.5 inches x 0.5 inch) were cut from these films and exposed in the modified Weather-Ometer and the specimen observed for the onset of embrittlement. The hours required for embrittlement and the stabilization rating of each sample was thereby determined. The exposure times to reach embrittlement, stabilization ratings and the formulations of the samples are presented in the following table. In this connection the copolymer of propylene and 1-butene referred to in the table had a weight ratio of propylene to 1-butene of 80:20.

Samples 2–4 correspond in formulation to the specific embodiments of Examples 29–31, samples 6–9 correspond in formulation to the specific embodiments of Examples 32–35 while samples 11–13 correspond in formulation to the specific embodiments of Examples 36–38.

These data show that the anthraquinones of this invention are effective ultraviolet light stabilizers for other 1-olefin resins.

Other features, advantages and embodiments of this invention will be apparent to those in the exercise of ordinary skill in the art after reading the foregoing disclosures. In this regard, while specific embodiments of this invention have been described in considerable detail, variations and modifications of these embodiments can be effected within the spirit and scope of this invention as disclosed and claimed.

What is claimed is:

1. A normally solid thermoplastic composition comprising (A) a normally solid polypropylene and (B) at least one substituted anthraquinone selected from the group consisting of 2,4,5,7-tetrabromo-1,8-dihydroxyanthraquinone, 1-hydroxyanthraquinone, 1,5-dihydroxy-4,8-dinitroanthraquinone, 1,4-dihydroxyanthraquinone, 1,8-dihydroxyanthraquinone, 1,5 - dihydroxyanthraquinone, 2,6 - dihydroxy-1,5-dinitroanthraquinone, 1 - hydroxy-5-nitroanthraquinone, 1-hydroxy-8-nitroanthraquinone, 1,6-diphenoxyanthraquinone, 1,7-dihydroxy-4,8-dinitroanthraquinone, and 1,6-dihydroxy-4,5-dinitroanthraquinone, said substituted anthraquinone being present at a concentration sufficient to substantially inhibit ultraviolet light degradation of said polypropylene.

2. A composition as in claim 1, wherein the amount of said substituted anthraquinone in said composition is from about 0.1 to about 10 weight percent, based on the weight of said polypropylene.

3. A composition as in claim 1, wherein said substituted anthraquinone is 1-hydroxy-8-nitroanthraquinone.

4. A composition as in claim 1, wherein said substituted anthraquinone is 1,6-dihydroxy-4,5-dinitroanthraquinone.

5. A composition as in claim 1, wherein said substituted anthraquinone is 1-hydroxy-5-nitroanthraquinone.

6. A composition as in claim 1, wherein said substituted anthraquinone is 1,7-dihydroxy-4,8-dinitroanthraquinone.

7. A composition as in claim 1, wherein said substituted anthraquinone is 1,5-dihydroxy-4,8-dinitroanthraquinone.

8. A composition as in claim 1, wherein said substituted anthraquinone is 1,5-dihydroxyanthraquinone.

9. A composition as in claim 1, wherein said substituted anthraquinone is 1,8-dihydroxyanthraquinone.

| Sample No. | 1-Olefin Resin | Additive | Hours of Exposure | Stabilization Rating |
|---|---|---|---|---|
| 1 | Normally solid poly(3-methyl-1-butene) | None | 19 | 1.0 |
| 2 | do | 1,5-dihydroxy-4,8-dinitro-anthraquinone | 114 | 6.0 |
| 3 | do | 1,5-dihydroxyanthraquinone | 96 | 5.0 |
| 4 | do | 1,8-dihydroxyanthraquinone | 72 | 3.8 |
| 5 | Normally solid poly(4-methyl-1-pentene) | None | 16 | 1.0 |
| 6 | do | 1-hydroxy-8-nitroanthraquinone | 230 | 14.4 |
| 7 | do | 1,5-dihydroxy-4,8-dinitroanthraquinone | 96 | 6.0 |
| 8 | do | 1,5-dihydroxyanthraquinone | 72 | 4.5 |
| 9 | do | 1,8-dihydroxyanthraquinone | 64 | 4.0 |
| 10 | Normally solid copolymer of propylene and 1-butene | None | 22 | 1.0 |
| 11 | do | 1,5-dihydroxy-4,8-dinitroanthraquinone | 440 | 20.0 |
| 12 | do | 1,8-dihydroxyanthraquinone | 380 | 17.0 |
| 13 | do | 1,5-dihydroxyanthraquinone | 232 | 14.0 |

10. A shaped article of the composition defined in claim 1.

References Cited

UNITED STATES PATENTS

| | | | |
|---|---|---|---|
| 2,897,423 | 7/1959 | Ross | 260—45.95 |
| 3,018,154 | 1/1962 | Downey et al. | 260—45.7 |
| 3,046,249 | 7/1962 | Hermann | 260—45.95 |
| 3,172,872 | 3/1965 | Kraus et al. | 260—45.7 |
| 3,259,604 | 7/1966 | Hawkins et al. | 260—45.7 |

DONALD E. CZAJA, *Primary Examiner.*

LEON J. BERCOVITZ, *Examiner.*

H. E. TAYLOR, JR., *Assistant Examiner.*